United States Patent [19]
Heyse et al.

[11] Patent Number: 5,650,575
[45] Date of Patent: Jul. 22, 1997

[54] METHOD FOR DETERMINING THE SPRING FORCE OF A CLOSING SPRING UPON THE OPENING OF A VALVE OF A FUEL INJECTION VALVE AND AN APPARATUS FOR CARRYING OUT THE METHOD

[75] Inventors: Joerg Heyse, Markgroeningen; Ralph Ittlinger, Leonberg, both of Germany

[73] Assignee: Robert Bosch GmbH, Stuttgart, Germany

[21] Appl. No.: 566,346

[22] Filed: Dec. 1, 1995

[30] Foreign Application Priority Data

Dec. 3, 1994 [DE] Germany ............................ 44 43 137.6

[51] Int. Cl.⁶ .............................. G01L 1/02; G01L 5/08
[52] U.S. Cl. ..................... 73/862.582; 73/119 A; 73/862.581
[58] Field of Search ...................... 73/862.381, 862.581, 73/862.582, 862.583, 862.584

[56] References Cited

U.S. PATENT DOCUMENTS

| | | | |
|---|---|---|---|
| 4,231,340 | 11/1980 | Nishimiya et al. | 123/568 |
| 4,646,975 | 3/1987 | Horn | 239/585 |
| 4,662,564 | 5/1987 | Okuda | 73/119 A |
| 4,704,999 | 11/1987 | Hashikawa et al. | 123/299 |
| 4,826,086 | 5/1989 | Ogawa et al. | 73/119 A |
| 5,161,500 | 11/1992 | Kubis et al. | 123/321 |
| 5,190,221 | 3/1993 | Reiter | 239/463 |
| 5,340,032 | 8/1994 | Stegmaier et al. | 239/575 |

*Primary Examiner*—George M. Dombroske
*Assistant Examiner*—Max H. Noori
*Attorney, Agent, or Firm*—Edwin E. Greigg; Ronald E. Greigg

[57] ABSTRACT

A method and apparatus for determining the spring force of a closing spring upon the opening of a valve, the valve is connected by means of a connection to a pressurized-gas line in which a pressure measuring device and, upstream of the latter, a variable pressure-regulating valve, a shut-off valve and a pressurized gas source are arranged. The end of the valve opposite from the pressure line connection is connected to a flow meter. After the shut-off valve has been actuated into its open position, the control pressure regulated at its outlet by the pressure-regulating valve is changed in such a way that it rises. Once the control pressure has risen to a value at which the valve closing element rises from the valve seat, i.e., the valve opens, the flow meter transmits a measurement signal which characterizes the flow of pressurized gas and which is input into a control and evaluation unit in addition to the value for the control pressure determined by the pressure measuring device. From the control pressure determined, the control and evaluation unit calculates the spring force of the closing spring upon the opening of the valve. The method is suitable, for measuring the spring force of a closing spring of a fuel injection valve for internal combustion engines without having to remove any part of the fuel injection valve.

11 Claims, 2 Drawing Sheets

METHOD FOR DETERMINING THE SPRING FORCE OF A CLOSING SPRING UPON THE OPENING OF A VALVE OF A FUEL INJECTION VALVE AND AN APPARATUS FOR CARRYING OUT THE METHOD

PRIOR ART

The invention starts from a method for determining the spring force of a closing spring upon the opening of a valve, and from an apparatus for carrying out the method. With valves, especially fuel injection valves, there is a requirement, following the final assembly of the valve, to measure the spring force of the closing spring with which the latter presses the valve-closing element onto the valve seat. Such measurement of the spring force should take place without disassembly of and damage to the valve, so that continued operation of the valve without malfunctions is possible even after the measurement of the spring force.

ADVANTAGES OF THE INVENTION

The method according to the invention for determining the spring force of a closing spring upon the opening of a valve and the apparatus for carrying out the method has the advantage that the spring force of the closing spring can be determined in a simple manner without contact and without damage with the valve assembled. It is likewise advantageous here that, in the case of the method and the apparatus according to the invention, the valve-closing element does not have to be accessible from outside, i.e. there is no need for a further element acting on the valve-closing element.

BRIEF DESCRIPTION OF THE DRAWING

Art exemplary embodiment of the invention is depicted in simplified form in the drawing and explained in greater detail in the description which follows.

DESCRIPTION OF THE EXEMPLARY EMBODIMENT

Figure 1:
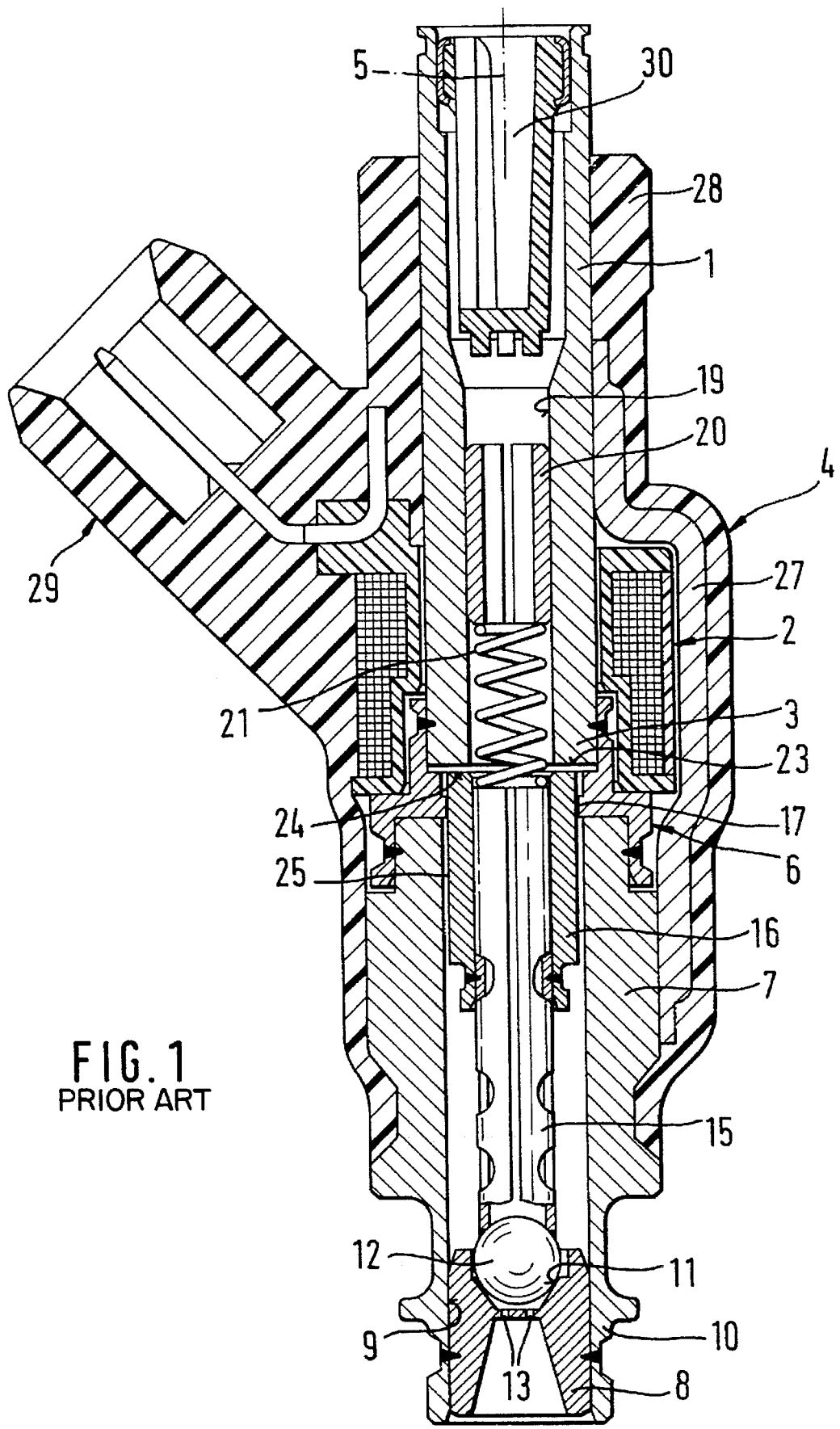
FIG. 1 shows a fuel injection valve of known construction.

The known electromagnetically actuable fuel injection valve 4, depicted as an example of a valve in FIG. 1, for fuel injection systems of internal combustion engines has an inlet connection 1 for the fuel, which serves as a core and which is partially surrounded by a magnetic coil 2. A tubular metal intermediate part 6 is connected leak-tightly and concentrically with respect to a valve longitudinal axis 5, by welding, to a lower core end 3 of the inlet connection 1. With its end remote from the inlet connection 1, the intermediate part 6 fits over a tubular connecting part 7 and is connected leak-tightly to the latter by welding. A cylindrical valve-seat body 8 is inserted into the downstream end of an internal bore 9 of the connecting part 7 and mounted leak-tightly by welding. The valve-seat body 8 has formed in it a valve seat 11 with which a valve-closing element 12 interacts. At least one spray opening 13, via which fuel can be injected into the air intake pipe or the cylinder of the internal combustion engine when the valve is open, is formed in the valve-seat body 8 downstream of the valve seat 11. The downstream end of the connecting part 7, said end holding the valve-seat body 8, forms an outlet connection 10 which is inserted in a manner not shown into the wall of the air intake pipe or cylinder of the internal combustion engine. The valve-closing element 12, which is of ball-shaped design in the exemplary embodiment, is connected to one end of a connecting tube 15 by welding or soldering, while an armature 16 manufactured from soft-magnetic material is connected by welding to the other end of the connecting tube 15. The valve-closing element 12, the connecting tube 15 and the armature 16 here project into the internal bore 9 of the connecting part 7. The tubular armature 16 is guided by a guide collar 17 of the intermediate part 6. An adjusting sleeve 20 is pushed into a flow bore 19 of the inlet connection 1 and resting against it is a closing spring 21 which is supported at the other end on the end of the connecting tube 15 situated in the armature 16 and hence loads the valve-closing element 12 toward the valve seat 11 in the closing direction of the valve. At its core end facing the armature 16, the inlet connection 1, which is manufactured from soft-magnetic material, has a core end face 23, while the armature has an armature end face 24 facing the core end 3. The core end face 23, the armature end face 24 and the cylindrical circumference of the armature 16 are provided at least in the region of the guide collar 17 with an anti-wear layer which prevents removal of material from the circumference 25 of the armature 16 and driving into one another of the core end face 23 and of the armature end face 24, when the magnet coil 2 is excited, the armature 16 is moved toward the inlet connection 1, counter to the force of the closing spring 21, until the armature end face 24 rests against the core end face 23. This attraction movement of the armature 16 leads to the valve-closing element 12 rising from the valve seat 11 and hence to opening of the fuel injection valve.

The magnet coil 2 is surrounded by at least one conducting element 27 which is designed as a curved bar in the exemplary embodiment, serves as a ferromagnetic element, extends in the axial direction over the entire length of the magnet coil 2 and at least partially surrounds the magnet coil 2 in the circumferential direction. The conducting element 27 rests against the inlet connection 1 by one end and against the connecting part 7 by its other end and is connected to these by welding. One part of the valve is surrounded by a plastic sheath 28 which, starting from the inlet connection 1, extends axially over the magnet coil 2 and the conducting element 27, of which there is at least one, as far as the connecting part 7. The plastic sheath 28 at the same time forms an electrical connecting plug 29 which is contacted electrically with the magnet coil 2 and can be connected in a manner not shown to an electronic control unit. A fuel filter 30 is pushed into the flow bore 19 of the inlet connection 1 in a known manner.

Figure 2:
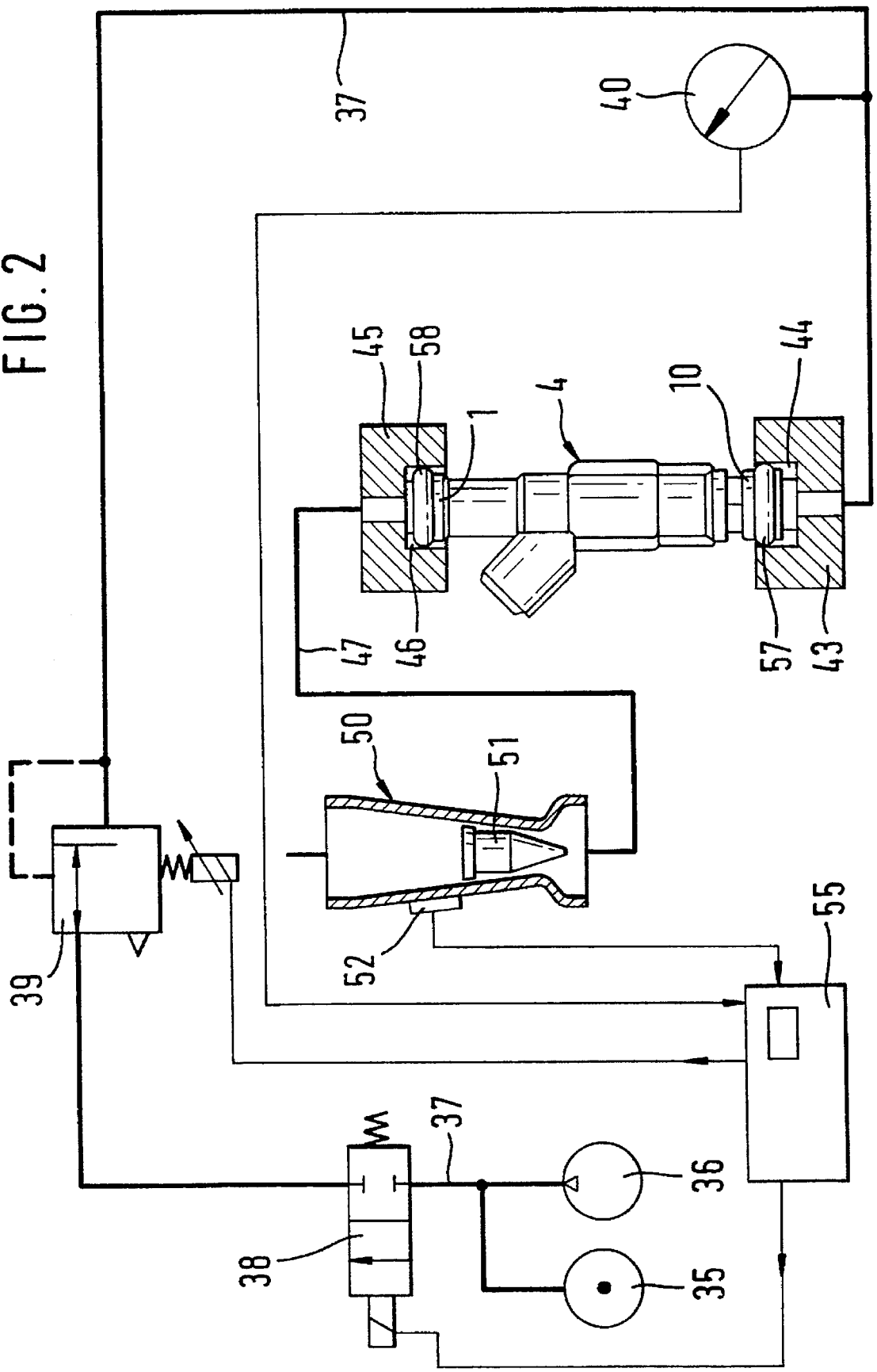
FIG. 2 shows an apparatus configured in accordance with the invention for determining the spring force of a closing spring upon the opening of a valve designed, for example, as a fuel injection valve.

FIG. 2 shows schematically an apparatus by means of which the spring force of a closing spring upon the opening of a valve can be determined, in particular the spring force of a closing spring of a fuel injection valve. The apparatus according to the invention is used, for example, to determine the spring force of the closing spring 21 of the fuel injection valve 4 depicted in FIG. 1. The apparatus comprises a pressurized-gas source 35, for example a nitrogen cylinder or the like. As the compressed-gas source use can also be made of a pump 36 which compresses air or some other gas. The outlet of the compressed-gas source 35 or pump 36 is connected to a pressurized-gas line 37. Arranged in the pressurized-gas line 37 is a shut-off valve 38, which is designed, for example, as a 2/2-way valve and, in its initial position, shuts off the pressurized-gas line 37. The shut-off valve 38 can be actuated electromagnetically, for example;

and, upon electromagnetic excitation, is moved out of its initial shut-off position into its open position. Arranged downstream of the shut-off valve 38 in the pressurized-gas line 37 is a variable pressure-regulating valve 39 which keeps the gas pressure downstream of the pressure-regulating valve largely constant at an adjustable control pressure. The pressure-regulating valve 39 acts as a pressure-reducing valve to which a variable electromagnetic force is applied, for example, in order to determine the control pressure to be regulated downstream in the pressurized-gas line 37. The pressure-regulating valve 39 thus reduces the pressure of the pressurized gas prevailing upstream of the pressure-regulating valve 39 to a low control pressure prevailing in the pressurized-gas line downstream of the pressure-regulating valve. A change in the control pressure can be achieved not only by the electromagnetic actuation described but also, for example, by pneumatic adjustment to the pressure-regulating valve 39. Connected to the pressurized-gas line 37 downstream of the pressure-regulating valve 39 is a pressure-measuring device 40 by means of which the control pressure in the pressurized-gas line 37 can be recorded and, if required, indicated. The shut-off valve 38, the variable pressure-regulating valve 39 and the pressure-measuring device 40 are units of known design. The pressurized-gas line 37 ends downstream of the pressure-measuring device 40 in an inlet connection body 43 which has an inlet location opening 44 connected to the pressurized-gas line 37. Likewise part of the apparatus according to the invention is an outlet connection body 45 with an outlet-receiving opening 46. Connected to the outlet receiving opening 46 of the outlet connection body 45 is an outlet line 47 in which a flow meter 50 of known design is arranged. As a known flow meter 50, FIG. 2 shows a rotameter, in which the position of the float 51 is detected photoelectrically by means of an electrical measuring transducer 52 and fed as a measurement signal to an electronic control and evaluation unit 55. The electronic control and evaluation unit 55 is likewise supplied with a measured value for the control pressure measured by the pressure-measuring device 40. The control and evaluation unit 55 can also serve to control the shut-off valve 38 and the pressure-regulating valve 39.

The fuel injection valve 4, for example, is used to carry out the method for the determination of the spring force of a closing spring upon the opening of a valve. For this purpose, the inlet location opening 44 of the inlet connection body 43 is pushed onto the outlet connection 10 of the fuel injection valve 4. A sealing ring 57 provided on the circumference of the outlet connection 10 provides a seal with respect to the wall of the inlet location opening 44. The outlet location opening 46 of the outlet connection body 45 is pushed onto the inlet connection 1 of the fuel injection valve, a sealing ring 58 on the circumference of the inlet connection 1 providing a seal with respect to the wall of the outlet location opening 46. During the execution of the method, the fuel injection valve 4 is in an unexcited state, i.e. the closing spring 21 holds the valve-closing element 12 on the valve seat 11, the valve thus being in a closed state. The execution of the method for determining the spring force of the closing spring can be performed in such a way, by a predetermined program in the control and evaluation unit for example, that the shut-off valve (38) is electromagnetically excited and hence actuated to its open position. The pressure of the pressurized gas determined by the pressurized-gas source 35 or the pump 36 is thereby applied to the inlet of the variable pressure-regulating valve 39. The pressure-regulating valve 39 is set here in such a way that, at its outlet, it regulates a control pressure which corresponds to its minimum control pressure and is so low that it is incapable of raising the valve-closing element 12 from the valve seat 11 counter to the spring force of the closing spring 21. The pressure-regulating valve 39 is then activated electromagnetically, for example by means of the control and evaluation unit 55, in such a way that the control pressure at its outlet rises uniformly and continuously. The continuously rising control pressure is measured by the pressure-measuring device 40 and recorded by the control and evaluation unit 55. If the control pressure downstream of the pressure-regulating valve 39 reaches a magnitude sufficient to raise the valve-closing element 12 from the valve seat 11 of the fuel injection valve 4 counter to the spring force of the closing spring 21, pressurized gas flows into the outlet line 47 and the flow meter 50 indicates a flow of pressurized gas, the beginning of flow in the outlet line 47 being detected by means of the measuring transducer 52 from a change in the position of the float 51 of the rotameter used here by way of example and being input as a measured signal to the control and evaluation unit 55. The control pressure of the pressure-measuring device measured at the time of the measurement signal of the flow meter 50 which characterizes the opening of the fuel injection valve 4 is recorded by the control and evaluation unit 55 and converted into a value which characterizes the spring force of the closing spring 21 upon the opening of the fuel injection valve 4. This value can be stored in the control and evaluation unit 55 and read out or printed out from the control and evaluation unit. The spring force of the closing spring upon the opening of the fuel injection valve 4 is determined in the control and evaluation unit 55 by multiplying the control pressure measured by the pressure-measuring device 40 upon the opening of the fuel injection valve by the area of the valve-closing element 12 which is acted upon by the control pressure in the compressed-gas line 37 when the fuel injection valve is closed. This area of the valve-closing element 12 acted upon by the control pressure is known from the manufacture of the fuel injection valve and can be input into the control and evaluation unit 55 as a constant factor.

The method according to the invention provides the advantage that the spring force can be determined with the valve fully assembled and does not result in any destruction or soiling of the valve. The method according to the invention also makes it possible to measure the spring force in the case of valves where it is very difficult to gain access to the valve-closing element from outside after they have been assembled, as shown, for example, with the fuel injection valve 4 in FIG. 1.

Since the spring is set against the adjusting sleeve 20 the spring force could be adjusted after measurement by movement of the adjusting sleeve in the proper direction.

The foregoing relates to preferred exemplary embodiments of the invention, it being understood that other variants and embodiments thereof are possible within the spirit and scope of the invention, the latter being defined by the appended claims.

We claim:

1. A method for determining the spring force of a closing spring upon the opening of a valve of a fuel injection valve, with at least one inlet connection and at least one outlet connection and with a valve closing element which is acted upon in a direction of a valve seat by the closing spring, the method comprising, closing said valve in its initial position, applying a pressurized fluid to one of said connections of said fuel injection valve in a direction for opening said valve, determining and measuring a pressure applied to said one connection of said fuel injection valve, by use of a pressure measuring device, applying a signal representative of the pressure measured to a control and evaluation unit, determining a moment that said valve is opened by said applied pressurized fuel, applying a signal to said control and evaluation unit representative of the moment of opening of said valve, recording the pressure at the moment of opening of said valve in accordance with the pressure measured by said pressure measuring device, and converting the measured pressure recorded into a value which characterized the spring force of the closing spring due to opening of the valve against the spring.

2. A method as set forth in claim 1, in which said pressurized fluid is connected with said outlet connection of said valve for a valve that opens inwardly.

3. A method as set forth in claim 1, in which said pressurized fluid is connected with said inlet connection of said valve for a valve that opens outwardly.

4. An apparatus for determining the spring force of a closing spring upon the opening of a valve, particularly a fuel injection valve, with at least one inlet connection and at least one outlet connection and with a valve closing element which is acted upon in the direction of a valve seat by the closing spring and is held by the closing spring in its initial position for closing said valve, which comprises, a source of a pressured fluid (35), a control valve (38) for controlling a flow of said pressured fluid in a pressure line (37), a pressure measuring device (40) in said pressure line, means for connecting an output line (47) to one of said inlet and outlet connections of said fuel injection valve a fluid flow meter connected in said output line (47), said fluid flow meter including an electrical measuring transducer which determines a moment of a flow of pressurized fluid through said fluid flow meter and an electronic control and evaluation unit (55) which receives a pressure signal from said pressure measuring transducer at a moment of opening of said valve in which the signals are converted to the spring force at the moment of opening said valve.

5. An apparatus as set forth in claim 4, in which for a valve that opens inwardly, said means for connecting an input of said pressurized fluid to said valve is connected to said output connection of said valve.

6. An apparatus as set forth in claim 4, in which for a valve that opens outwardly, said means for connecting an input of said pressurized fluid to said valve is connected to said input connection of said valve.

7. An apparatus as set forth in claim 4, in which said pressure line (37) includes a pressure regulating valve (39) upstream of said pressure measuring device (40), and said pressure regulating valve is controlled by said electronic control and evaluation unit (55).

8. An apparatus as set forth in claim 4, in which said electronic control and evaluation unit controls said control valve (38).

9. An apparatus as set forth in claim 5, in which said electronic control and evaluation unit controls said control valve (38).

10. An apparatus as set forth in claim 6, in which said electronic control and evaluation unit controls said control valve (38).

11. An apparatus as set forth in claim 7, in which said electronic control and evaluation unit controls said control valve (38).

* * * * *